United States Patent Office 3,549,313
Patented Dec. 22, 1970

3,549,313
COMPOSITION AND METHOD FOR RETARDING EVAPORATION OF WATER
George W. Eckert, Wappingers Falls, and William A. McDonald, Newburgh, N.Y., assignors to Texaco Inc., New York, N.Y., a corporation of Delaware
No Drawing. Filed June 4, 1969, Ser. No. 830,540
Int. Cl. B01j 1/18; C09k 3/00
U.S. Cl. 21—60.5
10 Claims

ABSTRACT OF THE DISCLOSURE

A method and composition for retarding evaporation of water from reservoirs, lakes and the like, wherein the composition consists of a mineral lubricating oil, trimer or dimer acid, a spreading agent and a petroleum or natural wax.

---

This invention is concerned with a composition for retarding the evaporation of water from bodies of water and with a method for conserving water in such bodies by forming a vapor barrier film on the exposed surface of the water by means of such a composition.

Conservation of water is a major problem in many geographical areas, particularly in arid or semi-arid regions where adequate sources of water are limited or are lacking altogether. To solve such a problem it is necessary to find means for preventing the escape of water molecules into the atmosphere. An obvious expedient is to add to the water a film-forming agent which forms a film on the exposed surface of the water and there by inhibits its evaporation.

However, the formation of a suitable film on the surface of the water involves a number of factors. The material used to form the film generally must be non-toxic to humans and to marine life; it must spread to a thin film to be economical but it must not spread too thin to be ineffective. Additionally, the components of the film must be compatible; the film must be flexible and self-reforming when broken by the motion of the water surface or by rain drops. Similarly since the regions lacking in water are often windswept it is important that the vapor barrier film adhere tenaciously to the exposed surface and is not blown to the external periphery of the body of water.

The main object of this invention therefor is to provide a composition which upon application to a body of water forms a vapor barrier film which is non-toxic to human or marine life.

An equally important object of the present invention is to provide a method for inhibiting the evaporation of water from bodies of water by forming on the exposed surface of the water a substantially continuous, flexible, self-healing barrier film.

Other objects of the invention will in part be obvious and in part hereinafter pointed out.

The film-forming composition according to the present invention consists essentially of a mineral lubricating oil to provide fluidity; trimer or dimer acid, to minimize water permeability of the film and to give the film adequate stability; a spreading agent and natural or mineral waxes, to provide a more stable film; and a solubilizer for these agents in the oil. The film-forming composition upon contact with water spreads rapidly on the surface thereby forming a vapor barrier film. Up to 50% of the oil and all the wax can be replaced with an undewaxed oil.

A particularly suitable vapor barrier film is formed by the use of 20 to 35% by weight of dimer or trimer acid, 0.1 to 1.0% of spreading agent; 1 to 15% by weight of wax; 0.5 to 5% by weight of solubilizer, with the balance being oil.

In order to give the composition sufficient fluidity to achieve a flexible film, a mineral oil is used. The oil component can be a naphthene base distillate, a paraffin base distillate or mixtures thereof which exhibit a low rate of evaporation such that upon formation of the vapor barrier film on the surface of the water the oil will not substantially vaporize. A mineral lubricating oil having a boiling point greater than preferably about 600° F., an SUS viscosity at 100° F. between about 96 and 1000 and an API gravity of between about 18 and 32 is preferred. The effectiveness of the present compositions has been found to decrease with increase of oil viscosity. The compositions of the invention contain from about 62 to about 75% of oil.

The wax employed in the claimed film-forming compositions is normally solid at room temperature and may include mineral or petroleum waxes, for example, paraffin waxes derived from the lighter fractions in the distillation of petroleum; or microcrystalline wax obtained from the dewaxing of heavy distillate or residual lubricating oils. Also suitable where available at a low cost are naturally occurring waxes such as beeswax, carnauba wax, spermaceti, candelilla, Japan wax, montan wax, ouricuri wax and ozocerite. Generally, petroleum waxes are more readily available and therefor more economical than natural waxes and for that reason they are particularly suitable for use in our improved film-forming composition. The wax, regardless of its origin, advantageously will have a melting point ranging from about 115° to 300° F. and preferably between about 120° F. and 160° F. Optimum evaporation retardation is obtained with about 3% by weight of wax.

In order to accomplish spreading of the film, a surface active spreading agent has been found necessary. Suitable spreading agents include polyoxyethylene sorbitol monostearate, monooleate and trioleate; polyethylene col monolaurate, polyethylene glycol monooleate, polyethylene glycol dioleate, and glycerol monooleate. A preferred spreading agent is an oleic acid partial ester of sorbitol, marketed under the name of "Arlatone T" by Atlas Corp. As above stated, the useful concentration of spreading agent is about 0.1 to 1.0 percent and preferably 0.5 to 1.0%. Below this range, the film is not sufficiently stable on standing. Above it, the film spreads too much and has insufficient thickness to be retentive.

An important constituent of the claimed composition is an additive which reduces the permeability of the vapor barrier film to water. This additive preferably is trimer acid, a $C_{54}$ long chain tricarboxylic acid made by condensing 3 molecules of linoleic acid, having an approximate molecular weight of 850 and an approximate equivalent weight of 283. Also suitable is dimer acid, a $C_{36}$ aliphatic dibasic acid made by condensing 2 moles of linoleic acid, having an approximate molecular weight of 565 and an approximate equivalent weight of 283. Mixtures of these acids can be used to good advantage in thickening the film.

To prevent separation of the dimer or trimer acid and the oil and wax, a solubilizer has been found useful. Suitable solubilizers include oleic acid, benzoic acid, "Emery acid 3101" (a branched $C_{18}$ saturated acid), hydroxyphenyl stearic acid, stearic acid and neo-tridecanoic acid.

A study of the effects on evaporation caused by changing the amount of film on the surface has shown that above 0.035 gram per sq. ft. the effect of the film is very good. It is preferred to use about 0.05 g./sq. ft. of surface to assure a high level of evaporation retardation.

The invention is further illustrated but not limited by the following examples:

EXAMPLE I

To illustrate the advantages of our invention, runs were made comparing the percent reduction in evaporation of water using a three-component film-forming composition and a four-component film-forming composition according to the invention. In the first two runs 74.5 weight percent of solvent-treated and dewaxed mineral oil designated 100 Pale Oil having an API gravity of 21.0 to 27.0 and SUS viscosity at 100° F. of 100–108 was admixed with trimer acid and "Arlatone." In runs 3 and 4, 1.0% by weight of paraffin wax having a melting point of 125–127° F. manufactured by Texaco Inc. and designated "Texwax" replaced 1% of the oil. In runs 5 and 6 the weight of oil was reduced to 69.5% and that of wax increased to 5%. In calculating the vapor-inhibiting properties for each system, each of the compositions was tested two ways. In the first, a film of a given weight was applied to 500 cc. of water contained in a 600-cc. beaker. The beakers were weighed to the nearest gram and allowed to stand at ambient temperature and reweighed after 16, 40 and 64 hours, respectively, to determine the amount of evaporation. In the second test, 2500 cc. of water was used.

Table I below shows the results of the two tests.

TABLE I.—EFFECT OF WAX ADDITION

| Composition of blend, percent w.: | | | | | | |
|---|---|---|---|---|---|---|
| 100 pale oil | 74.5 | 74.5 | 73.5 | 73.5 | 69.5 | 69.5 |
| Trimer acid | 25 | 25 | 25 | 25 | 25 | 25 |
| Oleic acid partial ester of sorbitol | 0.5 | 0.5 | 0.5 | 0.5 | 0.5 | 0.5 |
| Texwax | | | 1.0 | 1.0 | 5.0 | 5.0 |
| Evaporation tests in 600 cc. beakers (500 cc. H$_2$O): | | | | | | |
| Weight of the film, g./sq. ft. | 0.56 | 3.63 | 0.74 | 2.22 | 1.69 | 3.04 |
| Reduction of evaporation, percent, after— | | | | | | |
| 16 hours | | | 55 | 79 | 89 | 79 |
| 40 hours | | | 76 | 85 | 95 | 96 |
| 64 hours | | | 67 | 81 | 86 | 83 |
| 72 hours | | 65 | | | | |
| Evaporation tests in 3,000 cc. beakers (2,500 cc. water): | | | | | | |
| Weight of the film, g./sq. ft. | | | 0.43 | 0.91 | 1.05 | |
| Reduction of evaporation, percent, after 138 hours | | | 43 | 55 | 80 | |

It will be observed from the table that 1% of wax in these formulations will be effective but that 5% thereof results in a significant improvement in evaporation reduction.

EXAMPLE I–A

Runs were made to determine the effect of leaving out polybasic acid from the formations. Table IA below shows that leaving out the polybasic acid results in no prevention of evaporation.

TABLE IA.—EVAPORATION TESTS ON COMPOSITIONS NOT CONTAINING TRIMER ACID (No Simulated Wind)

| Composition of blend, percent w.: | | | |
|---|---|---|---|
| 100 pale oil | 89.5 | 94.5 | 95.0 |
| Oleic acid partial ester of sorbitol | 0.5 | 0.5 | 0.5 |
| Texwax | 5.0 | 5.0 | None |
| Neo-tridecanoic acid | 5.0 | None | None |
| Trimer acid | None | None | None |
| Evaporation tests in 600 cc. beakers (500 cc. water): | | | |
| Weight of film, grams/sq. ft. | 1.07 | 3.79 | 3.34 |
| Reduction of evaporation, percent, after— | | | |
| 16 hours | 0 | | |
| 72 hours | | 0 | 0 |
| | (No prevention of evaporation) | | |

EXAMPLE II

Separation of trimer acid and oil having been noted at room temperature, several solubilizing agents were investigated to prevent such separation. In the third and fourth run of Table II, below, solvent-treated and dewaxed 100 E Pale Oil was used having an API gravity of 27–31, an SUS of 96.104 at 100° F. and an initial boiling point of 684° F. The same test method as above given in Example I was used except that the samples were examined visually for separation or cloudiness when they were weighed.

TABLE II.—EVAPORATION TEST RESULTS WITH NEO-TRIDECANOIC ACID AS A STABILIZER IN THE BLENDS

| Composition of the blends, percent w.: | | | | | |
|---|---|---|---|---|---|
| 100 pale oil | 69.5 | 64.5 | | | 74.5 |
| 100 E pale oil | | | 69.5 | 64.5 | |
| Trimer acid | 25 | 25 | 25 | 25 | 25.0 |
| Oleic acid partial ester of sorbitol | 0.5 | 0.5 | 0.5 | 0.5 | 0.5 |
| Texwax | | 5.0 | | 5.0 | |
| Neo-tridenanoic acid | 5.0 | 5.0 | 5.0 | 5.0 | |
| Appearance at room temperature | (1) | (1) | (1) | (1) | (2) |
| 600 cc. beaker evaporation tests: | | | | | |
| Wt. of film, g./sq. ft. | 2.03 | 1.64 | 3.19 | 3.26 | 0.56 |
| Reduction of evaporation, percent, after— | | | | | |
| 24 hours | 37 | 100 | 37 | 87 | |
| 48 hours | 28 | 100 | 38 | 95 | |
| 72 hours | 25 | 100 | 33 | 97 | 75 |
| 3,000 cc. beaker evaporation tests: | | | | | |
| Wt. of film, g./sq. ft. | 2.28 | 1.03 | 1.14 | 1.16 | |
| Reduction of evaporation, percent, after— | | | | | |
| 144 hours | 22 | 88 | 24 | 94 | |
| 240 hours | 33 | 93 | 43 | 95 | |

[1] Uniform liquid.
[2] Separation to two layers.

In additional tests the amount of neo-tridecanoic acid was decreased to 0.5% by weight with no adverse effect. Substantially equivalent results were obtained by replacing neo-tridecanoic acid with "Emery Acid 2101," oleic acid, benzoic acid and stearic acid.

EXAMPLE III

Comparative runs were conducted to determine the effects of substituting other acids for trimer acid. The results obtained are tabulated in Table III below.

TABLE III.—EFFECTS OF SUBSTITUTION OF OTHER ACIDS FOR TRIMER ACID

| Blends, percent wt.: | | | | | | | |
|---|---|---|---|---|---|---|---|
| 100 pale oil | 68.5 | 68.5 | 68.5 | 68.5 | 68.5 | 68.5 | 43.5 |
| Texwax | 5.0 | 5.0 | 5.0 | 5.0 | 5.0 | 5.0 | 5.0 |
| Oleic acid partial ester of sorbitol | 0.5 | 0.5 | 0.5 | 0.5 | 0.5 | 0.5 | 0.5 |
| Neo-tridecanoic acid | 1.0 | 26.0 | 1.0 | 1.0 | 1.0 | 1.0 | 1.0 |
| Trimer acid | 25 | | | | | | |
| Dimer acid | | | 25.0 | | | | |
| Oleic acid | | | | 25.0 | | | |
| Benzoic acid | | | | | 25.0 | | |
| Stearic acid | | | | | | 25.0 | |
| TLA-214 [a] | | | | | | | 50.0 |
| Reduction of evaporation (600 cc. beaker tests): | | | | | | | |
| Wt. Film, g. sq. ft. | 1.71 | 1.01 | 1.45 | 1.52 | 1.06 | 1.64 | 2.74 |
| After 16 hours, percent | 72 | 0 | 0 | 0 | 6 | 6 | 0 |
| After 40 hours, percent | 81 | 3 | 56 | 0 | 6 | 3 | 0 |
| After 64 hours, percent | 84 | 8 | 39 | 0 | | | |

[a] 50 percent tetrapropenyl succinic acid—50 percent oil.

It will be observed that of the various additives investigated only dimer acid could be considered approximately functionally equivalent to trimer acid for the purposes of the claimed invention.

EXAMPLE IV

The effect of changing the wax content of the claimed composition on evaporation was investigated in the manner outlined in Example I. The results obtained are tabulated below in Table IV in which the other components are held constant.

TABLE IV.—EFFECT OF CHANGING WAX CONTENT ON EVAPORATION

| Composition of blend, percent w.: | | | | | | | |
|---|---|---|---|---|---|---|---|
| 100 pale oil | 72.5 | 71.5 | 70.5 | 69.5 | 68.5 | 63.5 | 58.5 |
| Trimer acid | 25 | 25 | 25 | 25 | 25 | 25 | 25 |
| Oleic acid partial ester of sorbitol | 0.5 | 0.5 | 0.5 | 0.5 | 0.5 | 0.5 | 0.5 |
| Neo-tridecanoic acid | 1.0 | 1.0 | 1.0 | 1.0 | 1.0 | 1.0 | 1.0 |
| Texwax | 1.0 | 2.0 | 3.0 | 4.0 | 5.0 | 10.0 | 15.0 |
| Evaporation tests in 600 cc. beakers: | | | | | | | |
| Weight of film, g./sq. ft. | 1.9 | 1.47 | 2.4 | 1.4 | 2.7 | 1.64 | 2.66 |
| Reduction of evaporation, percent, after— | | | | | | | |
| 16 hours | 66 | 55 | 77 | 77 | 100 | 71 | 78 |
| 64 hours | 72 | 63 | 87 | 94 | 100 | | |
| 88 hours | | | | | | 97 | 97 |
| 1008 hours (42 days) | 79 | 75 | 97 | 97.5 | 99 | | |

The results of Table IV indicate that 3 percent by weight of wax is about the maximum needed, as more than 3 percent thereof does not afford significant improvement; a 2 percent increase in wax content (from 3 to 5 percent) increasing the reduction of evaporation after 42 days by only 2 percent. Further tests indicated that the type of wax can have an effect on the performance of the claimed formulations.

EXAMPLE V

Several runs were conducted to show the effects on evaporation caused by changing the amount of film on the water surface. The test was conducted as given in Example I and the results are tabulated in Table V, below:

of films of two oil compositions according to the invention on evaporation taking place with air moving over the water surface to simulate a moderate wind is shown by the results in Table VII below. The movement of air over the water was produced by four metal blades (4 inches wide and 4 ft. long) rotated at a speed of about 1000 r.p.m. by a Bodine Variable Speed Motor (0.51 amp, 115 v.). The blades were maintained at about 2 inches above the water surface of water contained in 14 inch diameter evaporation discs.

TABLE V.—EVAPORATION RESULTS WITH DIFFERENT FILM WEIGHTS

| | Composition, percent weight: 100 pale oil—64.5; Trimer acid—25.0; Oleic acid partial ester of sorbitol—0.5; Neo-tridecanoic acid—5.0; Texwax—5.0 | | | | | | | | Composition, percent weight: 100 pale oil—68.5; Trimer acid—25.0; Oleic acid partial ester of sorbitol—0.5; Neo-tridecanoic acid—1.0; Texwax—5.0 | | | | |
|---|---|---|---|---|---|---|---|---|---|---|---|---|---|
| Evaporation test: | | | | | | | | | | | | | |
| Size of dish | A | A | A | A | A | A | A | A | C | C | C | B | B |
| Film weight, g./sq. ft. | 0.110 | 0.117 | 0.231 | 0.43 | 0.59 | 0.99 | 1.03 | 1.74 | 0.035 | 0.077 | 1.37 | 0.99 | 2.7 |
| Reduction of evaporation, percent, after— | | | | | | | | | | | | | |
| 2 days | | | | | | | | | | | | 96 | 100 |
| 3 days | | 87 | 92 | | | | | | | | | | |
| 4 days | 75 | | | 85 | 89 | | 98 | | 77 | 90 | | | |
| 5 days | | | 93 | | | | | | | | 97 | | |
| 6 days | | 90 | | | | 88 | | | | | 95 | | |
| 7 days | 85 | | 95 | 92 | 95 | 91 | | | 47 | 90 | | | |
| 10 days | 85 | | | | 95 | | | | | | | | |

"A" refers to 3,000 cc. beakers.
"B" refers to 600 cc. beakers.
"C" refers to 14 inch evaporating dishes.

The results clearly illustrate that above 0.035 g./sq. ft., the effect of the film is very good but at 0.035 g./sq. ft. the reduction of evaporation has fallen off drastically. The optimum value can be seen at about 0.05 g./sq. ft.

EXAMPLE VI

Runs were conducted in which rain was simulated by letting drops of water hit the water surface. In this example films were applied to the water surface as before and after 312 hours, water was dropped through the films. The results of the evaporation test before and after dropping water are tabulated in Table VI below:

TABLE VI.—EFFECTS OF DROPPING WATER THROUGH A SURFACE FILM

| Oil blend, composition, percent w.: | | |
|---|---|---|
| 100 pale oil | 64.5 | |
| 100 E pale oil | | 64.5 |
| Trimer acid | 25 | 25 |
| Oleic acid partial ester of sorbitol | 0.5 | 0.5 |
| Texwax | 5.0 | 5.0 |
| Neo-tridecanoic acid | 5.0 | 5.0 |
| Situation before dropping water through the film: Wt. of blend added to the water surface, g./sq. ft. | 1.03 | 1.16 |
| Hours of initial evaporation test | 312 | 312 |
| Reduction of evaporation prior to adding more water through the film, percent | 94 | 96 |
| Amount of water put as drops through the film, g. | 25 | 27 |
| Reduction of evaporation after putting water through the film, percent, after— | | |
| 72 hours | 96 | 82 |
| 96 hours | 98 | 85 |

Judging from the good reduction of evaporation even after this simulated rain, it can be concluded that the claimed films are substantially self-healing and satisfactorily re-form.

EXAMPLE VII

Tests were conducted to determine the adherence of the claimed composition on aqueous surfaces. The effect TABLE VII.—EFFECTS OF SIMULATED WIND ON EVAPORATION FROM A FILM-COATED WATER SURFACE

| Composition of film: | | | | |
|---|---|---|---|---|
| 100 pale oil, percent w | 64.5 | | 68.5 | |
| Trimer acid, percent w | 25.0 | | 25.0 | |
| Oleic acid partial ester of sorbitol | 0.5 | | 0.5 | |
| Neo-tridecanoic acid, percent w | 5.0 | | 1.0 | |
| Texwax, percent w | 5.0 | | 5.0 | |
| Wind simulation | (1) | (2) | (1) | (2) |
| Evaporation tests in 14 inch evaporation dishes: Amount of film, g./sq. ft. | 0.236 | 0.164 | 0.137 | 0.152 |
| Percent reduction of evaporation after— | | | | |
| 1 day | | 92.3 | | 97.4 |
| 2 days | | 94.2 | | 97.5 |
| 3 days | 95.2 | | | |
| 5 days | 95.4 | | 97.3 | |
| 6 days | | | 95.4 | |
| 7 days | 95.9 | | | |

[1] No wind.
[2] Wind simulated.

The results clearly show that the simulated wind did not detract from the effectiveness of the films.

EXAMPLE VIII

Other runs were conducted in which the evaporation of water was determined after 7 weeks standing. The formulation consisted of 25% W. Trimer Acid, 1% W. of a polyol fatty acid ester (Arlatone T), and a small amount of wax (Texwax") in an oil (100 Pale Oil).

The effect of wax content in the above formulation was determined in evaporation tests (room temperature) in 600 cc. beakers. The amounts of water evaporated were determined after 7 weeks standing. The results are tabulated below.

| | Water only | "A" | | | |
|---|---|---|---|---|---|
| Composition, percent w.: | | | | | |
| 100 pale oil | | 71.5 | 70.5 | 69.5 | 68.5 |
| Trimer acid | | 25.0 | 25.0 | 25.0 | 25.0 |
| Oleic acid partial ester of sorbitol | | 0.5 | 0.5 | 0.5 | 0.5 |
| Neo-tridecanoic acid | | 1.0 | 1.0 | 1.0 | 1.0 |
| Texwax | | 2.0 | 3.0 | 4.0 | 5.0 |
| Weight of film, grams/sq. ft. | | 1.47 | 2.4 | 1.4 | 2.7 |
| Loss in weight, grams in 7 weeks | 499 | 121 | 15 | 12 | 5 |
| Percent reduction of evaporation | | 75 | 97 | 97.5 | 99 |

The formulation in A containing 3 percent of wax listed in the above tabulation was tried at different surface volume weights in evaporation tests conducted in 3000 cc. beakers to show that a high percentage of evaporation reduction (80 to 96%) is obtained over a wide range of surface areas (.34 to 1.11 gram/sq. ft.) showing that the formulation is operative for a broad range of surface areas.

The results of the evaporation test are given in the following tabulation:

EVAPORATION TESTS IN 3,000 CC. BEAKERS (2,500 WATER)

| | Composition A | | | | |
|---|---|---|---|---|---|
| Weight of film, g./sq. ft. | ¹None | 0.34 | 0.54 | 0.88 | 1.11 |
| Loss in weight in 42 days, grams | 1,541 | 299 | 164 | 115 | 56 |
| Percent reduction of evaporation (after 42 days) | | 80 | 89 | 92 | 96 |

¹ Water only.

EXAMPLE IX

A run was conducted with a composition in which one half of the 100 pale oil and all the wax were replaced by an undewaxed oil. The composition was the following:

| | Percent |
|---|---|
| 100 pale oil | 34.75 |
| Filtered wax distillate | 34.75 |
| Trimer acid | 25.00 |
| Oleic acid partial ester of sorbitol | 0.5 |
| Neo-tridecanoic acid | 5.0 |

The evaporation tests in 3000 cc. beakers were carried out with a film weighing 0.267 g./sq. ft. The reduction of evaporation was 90.4% after 3 days; 93.1% after 5 days, and 93.2% after 7 days.

What we claim is:

1. A film-forming composition for retarding evaporation of water from the surface of bodies of water consisting essentially of about 20 to 35% by weight of dimer or trimer acid; about 0.1 to 1.0% by weight of a spreading agent; about 1 to 15% by weight of wax; the balance being a mineral oil having a boiling point greater than about 600° F., an SUS viscosity at 100° F. of between about 96 and 1000 and an API gravity of between about 18 and 32, said film forming composition being characterized by the ability to spread on the surface of water when contacted therewith thereby forming a water-adherent vapor barrier film which is substantially continuous and self-reforming.

2. The film-forming composition according to claim 1 wherein said wax comprises a paraffin wax having a melting point of from about 115 to 300° F.

3. The film-forming composition according to claim 1 wherein said wax has a melting point of from about 125°–127° F.

4. The film-forming composition according to claim 1 wherein said spreading agent is selected from the group consisting of polyoxyethylene sorbitol monostearate, monooleate and trioleate; polyethylene glycol monolaurate; polyethylene glycol monooleate, polyethylene glycol dioleate, glycerol monooleate and the oleic acid partial ester of sorbitol.

5. The film-forming composition according to claim 1 having incorporated therein an additive replacing up to about 50% of said mineral oil and all of said wax, said additive consisting of undewaxed oil.

6. A method for retarding the evaporation of water from bodies of water which comprises contacting said water with a solution consisting essentially of about 20 to 35% by weight of dimer or trimer acid; about 0.1 to 1.0% by weight of a spreading agent, about 1 to 15 by weight of wax; the balance being a mineral oil having a boiling point greater than about 600° F., an SUS viscosity at 100° F. of between about 96 and 1000 and an API gravity of between about 18 to 32; whereby a water adherent, substantially continuous and self-reforming vapor barrier film is formed on the exposed surface of the water.

7. The method according to claim 6 wherein said wax comprises a paraffin wax having a melting point of from about 115 to 300° F.

8. The method according to claim 6 wherein said wax has a melting point of from about 125–127° F.

9. The method according to claim 6 wherein said spreading agent is selected from the group consisting of polyoxyethylene sorbitol monostearate, monooleate and trioleate; polyethylene glycol monolaurate, polyethylene glycol monooleate; polyethylene glycol dioleate; glycerol monooleate and the oleic acid partial ester of sorbitol.

10. The method according to claim 6 wherein up to about 50% by weight of said oil and all of said wax is replaced by undewaxed oil.

References Cited
UNITED STATES PATENTS

| | | | |
|---|---|---|---|
| 1,814,053 | 7/1931 | Mueller et al. | 21—60.5X |
| 2,170,644 | 8/1939 | Nelson | 21—60.5 |
| 3,095,263 | 6/1963 | Eckert et al. | 21—60.5 |
| 3,431,062 | 3/1969 | Fox | 21—60.5 |
| 3,431,063 | 3/1969 | Fox | 21—60.5 |
| 3,431,064 | 3/1969 | Fox | 21—60.5 |
| 3,458,274 | 7/1969 | Cashman et al. | 21—60.5 |

MORRIS O. WOLK, Primary Examiner

B. S. RICHMAN, Assistant Examiner

U.S. Cl. X.R.

252—382, 384